United States Patent
Kasai et al.

(10) Patent No.: US 10,033,187 B2
(45) Date of Patent: Jul. 24, 2018

(54) EMERGENCY POWER SUPPLY METHOD FOR CONTAINER TERMINAL AND CONTAINER TERMINAL

(71) Applicant: MITSUI ENGINEERING & SHIPBUILDING CO., LTD., Tokyo (JP)

(72) Inventors: Hiroshi Kasai, Oita (JP); Nobuya Kayasuga, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 681 days.

(21) Appl. No.: 14/366,962

(22) PCT Filed: Dec. 20, 2012

(86) PCT No.: PCT/JP2012/083138
§ 371 (c)(1),
(2) Date: Jun. 19, 2014

(87) PCT Pub. No.: WO2013/094704
PCT Pub. Date: Jun. 27, 2013

(65) Prior Publication Data
US 2014/0346869 A1    Nov. 27, 2014

(30) Foreign Application Priority Data
Dec. 20, 2011   (JP) .................... 2011-278191

(51) Int. Cl.
*H02J 3/38*     (2006.01)
*B66C 13/12*    (2006.01)
(Continued)

(52) U.S. Cl.
CPC .............. *H02J 3/381* (2013.01); *B66C 13/00* (2013.01); *B66C 13/12* (2013.01); *H02J 3/40* (2013.01);
(Continued)

(58) Field of Classification Search
CPC ................. H02J 3/381; B66C 13/12
See application file for complete search history.

(56) References Cited

U.S. PATENT DOCUMENTS

| 4,678,063 | A | * | 7/1987 | Kitaoka | ................... | B66B 1/30 187/296 |
| 5,631,813 | A | * | 5/1997 | Ikeshita | ............... | H02M 5/4585 318/377 |

(Continued)

FOREIGN PATENT DOCUMENTS

| JP | 2003-246586 A | 9/2003 | | |
| JP | 3100558 U | * 5/2004 | ............. | B66C 19/00 |

(Continued)

OTHER PUBLICATIONS

International Search Report, dated Apr. 2, 2013, issued in corresponding application No. PCT/JP2012/083138.

*Primary Examiner* — Thienvu Tran
*Assistant Examiner* — Pinping Sun
(74) *Attorney, Agent, or Firm* — Westerman, Hattori, Daniels & Adrian, LLP

(57) ABSTRACT

Provided are an emergency power supply method for a container terminal and a container terminal, which supply emergency electric power by using a cargo handling machine as a power source in an emergency situation due to electric outage of the container terminal, or the like. In an emergency where an incoming panel (2) of the container terminal (1) cannot supply electric power, yard cranes (11*a*) to (11*c*) (cargo handling machines) configured to operate in the container terminal (1) are used as power sources, in (Continued)

which one (the yard crane (11a)) of the plurality of yard cranes (11a) to (11c) (cargo handling machines) is used as a reference power source, and power conditioning units are included which configured to match phases of electric powers of the remaining yard cranes (11b) and (11c) to a phase of electric power of the reference power source, such that electric power is supplied from the plurality of yard cranes (11a) to (11c) to the incoming panel (2).

11 Claims, 8 Drawing Sheets

(51) Int. Cl.
    *B66C 13/00*    (2006.01)
    *H02J 3/40*    (2006.01)
    *H02J 9/06*    (2006.01)
    *H02J 3/00*    (2006.01)

(52) U.S. Cl.
    CPC ......... *H02J 9/062* (2013.01); *H02J 2003/001* (2013.01); *Y10T 307/313* (2015.04); *Y10T 307/336* (2015.04)

(56) References Cited

U.S. PATENT DOCUMENTS

| | | | | |
|---|---|---|---|---|
| 7,405,494 B2 * | 7/2008 | Tassitino, Jr. | ........... | H02J 9/062 307/45 |
| 7,560,831 B2 * | 7/2009 | Whitted | ........... | H02J 9/061 307/64 |
| 7,656,060 B2 * | 2/2010 | Algrain | ........... | H02J 3/42 307/84 |
| 8,698,354 B2 * | 4/2014 | Ghosh | ........... | H02J 9/062 307/66 |
| 8,816,625 B2 * | 8/2014 | Kopiness | ........... | H02M 1/36 318/376 |
| 2005/0184594 A1 * | 8/2005 | Fredette | ........... | H01M 16/003 307/78 |
| 2006/0060396 A1 * | 3/2006 | Rozman | ........... | G01R 31/42 180/65.1 |
| 2008/0190703 A1 * | 8/2008 | Kato | ........... | B60K 6/46 187/224 |
| 2008/0217998 A1 * | 9/2008 | Parmley | ........... | H02J 1/10 307/65 |
| 2011/0316337 A1 * | 12/2011 | Pelio | ........... | H05K 7/1492 307/24 |
| 2012/0281802 A1 * | 11/2012 | Niida | ........... | G21C 9/004 376/282 |

FOREIGN PATENT DOCUMENTS

| | | | | |
|---|---|---|---|---|
| JP | 2005-033923 A | | 2/2005 | |
| JP | 2006-225093 A | | 8/2006 | |
| JP | 2011-162287 A | * | 8/2011 | ............ B66C 13/12 |
| JP | 2011-162287 A | | 8/2011 | |

* cited by examiner

EMERGENCY POWER SUPPLY METHOD FOR CONTAINER TERMINAL AND CONTAINER TERMINAL

TECHNICAL FIELD

The present invention relates to an emergency power supply method for a container terminal, and a container terminal, for supplying electric power during an emergency when electric outage occurs in the container terminal.

BACKGROUND ART

A container terminal is a facility where containers are loaded onto or unloaded from ships and the containers are carried in and out by foreign chassis for on-shore transportation. The container terminal serves also as a facility for temporarily storing containers unloaded or carried into the container terminal.

The container terminal will be described below with reference to FIG. 9. In a method of handling containers C in a container terminal 1X, the containers C loaded on a container ship S are unloaded by quay cranes 12X. The quay cranes 12X load the containers C onto trailers 13X. The trailers 13X carry the containers C to container storage areas 4. In the container storage areas 4, yard cranes 11X unload the containers C from the trailers 13X.

When the containers handled at this time are reefer containers (refrigerated containers) RCs, the containers are stored in a reefer container storage area 4R. The reefer containers RCs are connected to reefer stands 23, and the temperatures of the insides of the containers are maintained constant by electric power supplied from the reefer stands 23.

In the container terminal 1X, the operations of handling machines such as the yard cranes 11X, the quay cranes 12X, and the trailers 13X, the temperature management of the reefer containers RCs, and electric power management of the container terminal 1X are performed by a terminal management system installed in a management building 3. A computer for operating the terminal management system is provided in the management building 3.

Next, the flow of electric power in this container terminal 1X will be described. Electric power supplied from an electric power company 30 to an incoming panel 2 is divided at the incoming panel 2 and sent to the management building 3, bus bars 21, electric supply cables 22, and the reefer stands 23 via electric supply lines 20. The electric power is then sent to electrically-powered machines (the yard cranes 11X, the quay cranes 12X, and the reefer containers RCs). Besides, the electric power is also sent to a lighting system (not shown), other electrically-powered machines operating in the container terminal 1X (for example, goliath cranes, jib cranes, tower cranes, unloader cranes, overhead travelling cranes, and straddle carriers) and the like.

When electric outage has occurred in this container terminal 1X, for example, when the supply of electric power from the electric power company 30 is stopped, the supply of electric power to the electric supply lines 20, the bus bars 21, the electric supply cables 22, and the reefer stands 23 is stopped. As a result, the supply of electric power to the management building 3, the yard cranes 11X, the quay cranes 12X, and the reefer containers RCs is stopped. For this reason, there arise problems in that the terminal management system controlled in the management building 3 is stopped, and the temperature of the insides of the reefer containers RCs increase, and further, if the quay cranes 12X and the yard cranes 11X are during cargo handling operation, these cranes are stopped in the middle of suspending cargos.

Meanwhile, there are devices in each of which a power generator and a storage battery are mounted on a crane operating in a container terminal to be operable without supply of continuous electric power from the container terminal (see for example Patent Documents 1 and 2). Besides these devices, a large number of devices in which at least one of a power generator and a storage battery is mounted on a yard crane or a quay crane have been proposed. These devices can move independently by using electric power of a power generator or a secondary battery mounted thereon without supply of electric power from a container terminal, even when electric outage occurs in the container terminal. These devices can solve the problems in which cranes are stopped during handling cargos, even when electric outage occurs in the container terminal.

However, the problems in which a management building, in which a terminal management system is operating, or a reefer container, whose temperature would increase if no electric power is supplied, cannot be supplied with electric power at the time of emergency such as electric outage have not been solved. For overcoming this problem, a method in which a power generator that can be used as an emergency power source is prepared is conceivable. This method, however, has a problem in which the cost is increased for separately preparing the power generator, a problem in which it takes time to start the power generator to supply electric power, and the like.

PRIOR ART DOCUMENTS

Patent Documents

Patent Document 1: Japanese Patent Application Publication No. 2003-246586
Patent Document 2: Japanese Patent Application Publication No. 2006-225093

SUMMARY OF THE INVENTION

Problem to be Solved by the Invention

In view of this, an object of the present invention is to provide an emergency power supply method for a container terminal, and a container terminal, which are capable of promptly supplying electric power to electrically-powered machines and a management building in a container terminal without separately using a power generating facility at the time of emergency where electric power cannot be supplied to the electrically-powered machines and the management building in the container terminal due to electric outage and the like in the container terminal.

Means for Solving the Problem

An emergency power supply method for a container terminal of the present invention for solving the above-described problem is a method characterized in that a cargo handling machine configured to operate in the container terminal is used as a power source, and electric power of the cargo handling machine is supplied to the container terminal as emergency electric power.

According to this method, in such an emergency situation where electric power cannot be supplied to machines in the container terminal due to electric outage of the container terminal, the cargo handling machine operating in the container terminal is used as a power source, and electric power of the cargo handling machine can be supplied to the container terminal as emergency electric power for the container terminal. Accordingly, even in an emergency situation, the electrically-powered machines in the container terminal and a computer in a management building can be operated.

Moreover, in a case where emergency electric power is secured by providing a power generator for emergency, the power generator needs to be activated at the beginning, which takes time to supply electric power. On the other hand, according to the above-described configuration, since electric power of the cargo handling machine operating in the container terminal is supplied, electric power can be supplied promptly in an emergency situation where electric power is not being supplied in the container terminal.

The emergency situation mentioned here means a situation where supply of electric power from the outside of the container terminal is stopped, a situation where electric outage occur in the container terminal, or a situation where supply of electric power to an electrically-powered machines, a management building, or the like, in which a problem in operation occurs if electric power is not supplied, is stopped.

In addition, the above-described emergency power supply method for a container terminal may be configured such that in an emergency situation where an incoming panel of the container terminal cannot supply electric power, electric power is supplied from a plurality of the cargo handling machines to the incoming panel, wherein at least one of the cargo handling machines is used as a reference power source, and phases of electric power of the remaining ones of the cargo handling machines are matched to a phase of electric power of the reference power source. This makes it possible to send electric power of the plurality of cargo handling machines to a feeder panel of the container terminal. Therefore, electric power of a large amount of electric power capacity can be obtained in an emergency situation.

If electric power obtained in an emergency situation is of a large capacity, when electric outage occurs in the container terminal, electric power for emergency evacuation of cranes involved in cargo handling operation can be supplied to secure the safety of the cargo handling operation. Moreover, electric power for cooling the reefer containers (refrigerated containers) can be supplied to maintain the temperatures inside the reefer containers at constant level. Furthermore, electric power for the management building can be supplied for emergency to prevent the system of the container terminal from being stopped.

A container terminal of the present invention for solving the above-described problem is configured such that a container terminal includes: a cargo handling machine configured to supply electric power to the container terminal as a power source in an emergency situation of the container terminal. This configuration makes it possible to use the cargo handling machine as a power source to promptly supply electric power of the cargo handling machine to the container terminal, thereby covering the electric power of the container terminal, in an emergency situation such as electric outage of the container terminal.

Moreover, the above-described container terminal may be configured such that at least one of a plurality of the cargo handling machines is used as a reference power source, and the remaining ones of the cargo handling machines include power conditioning units configured to match electric powers of the remaining cargo handling machines to a phase of electric power of the reference power source, such that in an emergency situation where an incoming panel of the container terminal cannot supply electric power, electric power is supplied from the plurality of cargo handling machines to the incoming panel. This makes it possible to supply electric power from a plurality of cargo handling machines. Accordingly, a large amount of electric power can be supplied to the container terminal in an emergency situation. Therefore, even if electric outage occurs in the container terminal, electric power can be supplied to the cranes during cargo handling operation, the reefer containers, and the management building.

In particular, when electric power of the cargo handling machines is AC electric power, the phases of electric power to be supplied to the incoming panel need to be matched. In this regard, the power conditioning units are provided to match the phases of electric power of the remaining cargo handling machine to the phase of electric power of one of the cargo handling machine. Moreover, even when the container terminal includes two or more incoming panels, there will be a single system of root. Accordingly, it is only necessary to provide a cargo handling machine that is used as a single reference power source.

It is only necessary for the power conditioning units to be capable of matching the phases or the like of electric power of the plurality of cargo handling machines so that electric power of the cargo handling machines can be supplied to the incoming panel. Each of the power conditioning units may thus be a converting device such as a converter, an inverter, a chopper, a transformer, or a thyristor, for example, or may be any combination of these.

In addition, in the above-described container terminal, the power conditioning unit is configured with two converters or with an inverter and a converter. In this case, when a non-regenerative converter is provided besides regenerative converters provided in cargo handling machines operating with supply of electric power from the container terminal in a normal situation, the frequencies of electric power can be matched to the electric power of the reference power source. Moreover, even when electric power is being supplied to the container terminal, the powers of the cargo handling machines can be supplied. Therefore, electric power can be supplied while the cargo handling machines are being operated.

Moreover, in the above-described container terminal, if each cargo handling machine includes an electric power supply device configured to receive electric power in a normal situation where an incoming panel of the container terminal can supply electric power, and to supply electric power to the incoming panel in the emergency situation where the incoming panel of the container terminal cannot supply electric power, a machine which receives electric power from the incoming panel of the container terminal in the normal situation can be used as an electric power supply device for supplying electric power to the incoming panel of the container terminal in the emergency situation due to electric outage and the like.

Therefore, a separate machine for supplying power source for emergency does not need. This electric power supply device may be, for example, a bus bar, a cable reel, a charging cable for a storage battery, or the like. In particular, using a bus bar or a cable reel, which is thus always connected to the incoming panel, allows emergency electric power to be promptly supplied.

Furthermore, in the above-described container terminal, each cargo handling machine is a crane including at least one of a power generator and a storage battery. In this case, providing a power generator or a storage battery to a crane, which can operate independently, makes it possible to use the crane as an emergency power source and to use electric power of the crane as emergency electric power for the container terminal, even if electricity is not always supplied from the container terminal. This crane is for example a yard crane, a quay crane, or the like. Moreover, if this crane is in cargo handling operation, electric power may be supplied from a crane not in cargo handling operation to the crane in cargo handling operation to thus secure the safety of the crane in operation.

Effect of the Invention

According to the present invention, in an emergency situation where electric power cannot be supplied to electrically-powered machines or a management building in a container terminal due to electric outage or the like in the container terminal, it is possible to promptly supply electric power to the electrically-powered machines and the management building in the container terminal without using a separate power generating facility.

MODES FOR CARRYING OUT THE INVENTION

Figure 9:
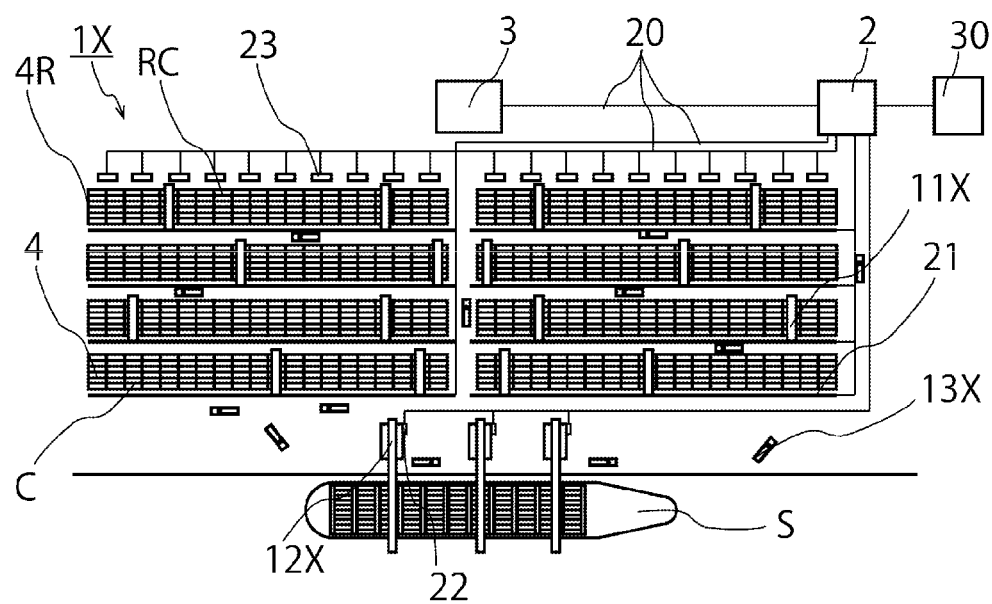
FIG. 9 is a plan view showing a conventional container terminal.

Hereinafter, emergency power supply methods for a container terminal and container terminals of first to fifth embodiments according to the present invention will be described with reference to the drawings. Note that in the container terminals of the first to fifth embodiments according to the present invention, the same configurations and operations as those of the conventional container terminal, which has been described by use of FIG. 9, are given the same reference numerals and will not be described.

In addition, cargo handling machines of the container terminals of the first to fifth embodiments according to the present invention will be described by giving yard cranes and quay cranes as examples. However, the cargo handling machines can be any machines as long as they can operate independently without supply of electric power of the container terminal and are not limited to yard cranes and quay cranes. For example, the present invention can be applied to cargo handling machine such as goliath cranes, jib cranes, tower cranes, unloader cranes, overhead travelling cranes, straddle carriers, and trailers (conveyance trucks).

Figure 1:
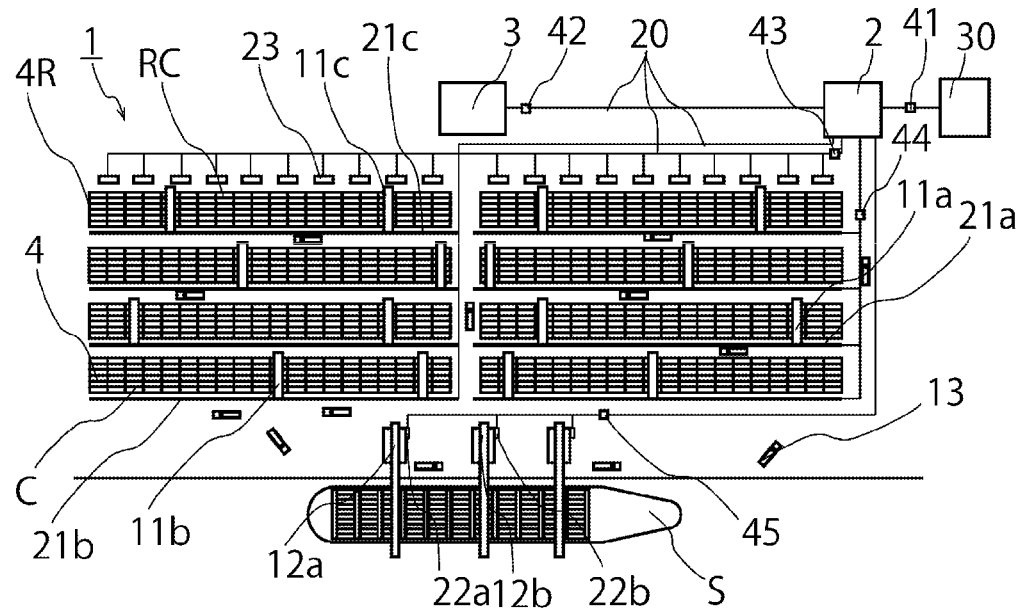
FIG. 1 is a plan view showing a container terminal of a first embodiment according to the present invention.

The container terminal of the first embodiment according to the present invention will be described with reference to FIG. 1. A container terminal 1 includes an incoming panel 2, a management building 3, and container storage areas 4, and includes yard cranes 11a to 11c, quay cranes 12a to 12b, and trailers 13, as the cargo handling machines. In addition, the container terminal also includes electric supply lines 20, bus bars 21a to 21c, electric supply cables 22a and 22b, and reefer stands 23, as devices for supplying electric power from the incoming panel 2. The container terminal includes electric power sensors 41 to 45 in the respective electric supply lines 20.

The electric power supplied to the incoming panel 2 of the container terminal 1 from the electric power company 30 is alternate current, and the description will be made on the assumption that the electric power sent via the electric supply lines 20 is alternate current. However, the electric power is not limited to alternate current, and can be direct current.

The above-described configurations can be achieved by using known techniques except the yard cranes 11a to 11c and the quay cranes 12a and 12b. In addition, the container terminal 1 is not limited to the above-described configurations in terms of how large the scale is, the shapes of the container storage areas 4, and the types of the cargo handling machines to be used, and the like. In addition, although the container terminal 1 obtains electric power from the electric power company 30, it is only necessary to be able to obtain electric power to be consumed in the container terminal 1. For example, a power generation plant that uses power generators or a power generation device that generates electric power from natural energy can be provided instead. Moreover, the number of the incoming panel 2 is not limited. When the container terminal 1 is supplied with a plurality of lines of electric power, the number of the incoming panel 2 can be increased accordingly.

Next, an emergency power supply method for the container terminal 1 of the first embodiment according to the present invention will be described. In a normal situation, each of the electric power sensors 41 to 45 detects the flow of electric power, and the electric power in the container terminal 1 is monitored by the terminal management system in the management building 3. First, the supply of electric power from the electric power company 30 to the incoming panel 2 is detected by the electric power sensor 41. Next, the supply of electric power from the incoming panel 2 into the container terminal 1 is detected by the electric power sensors 42 to 45. If the electric power sensor 41 or at least one of the electric power sensors 42 to 45 cannot detect the flow of electric power, the terminal management system determines that it is in an emergency.

Next, the terminal management system selects cargo handling machines that include a power generator or a storage battery and are capable of producing electric power, from the cargo handling machines that are not in cargo handling operation and the cargo handling machines that have extra electric power to spare. The terminal management system then classifies the selected cargo handling machines into a reference power source and same-phase power sources. As the method of determining a cargo handling machine to be used as the reference power source, the following can be used: a method in which a cargo handling machine to be used as the reference power source is determined in advance; and a method in which a cargo handling machine that is capable of most promptly sending electric power to the incoming panel 2 is determined as a cargo handling machine to be used as the reference power source, on essential conditions that the cargo handling machine to be selected is producing electric power necessary for the activation.

For example, in the embodiment, the yard crane 11a which is producing electric power necessary for the activation is used as the reference power source and the yard cranes 11b and 11c are used as the same-phase power sources that match their own electric powers to the phase of the electric power of the reference power source. In addition, the quay crane 12a which is not in cargo handling operation is also determined as the same-phase power source. All of these are cargo handling machines that are not in cargo handling operation. On the other hand, since the quay crane 12b is in cargo handling operation, the quay crane 12b is not used as an emergency power source. The cargo handling machine to be used as the reference power source or the same-phase power source only needs to be capable of generating necessary electric power, and is not limited to the above-described configuration.

Next, the terminal management system instructs the yard crane 11a used as the reference power source and the yard cranes 11b and 11c and the quay crane 12a used as the same-phase power sources other than the reference power source to send electric power to the incoming panel 2. Subsequently, the yard crane 11a used as the reference power source sends electric power to the incoming panel 2, and the yard cranes 11b and 11c and the quay crane 12a used as the same-phase power sources send electric power matched to the phase of the electric power of the reference power source to the incoming panel 2. The incoming panel 2 supplies the thus supplied electric power to the corresponding sites in the container terminal 1.

Since the above-described operation is controlled by the terminal management system in the management building 3, the terminal management system needs to be activated. In this regard, it is preferable that the computer which operates the terminal management system in the management building 3 be connected to an emergency power source device so that the terminal management system can be operated at least for a little period of time even when the supply of electric power to the management building 3 is stopped. This makes it possible to carryout the above-described emergency power supply method in an emergency.

Figure 2:
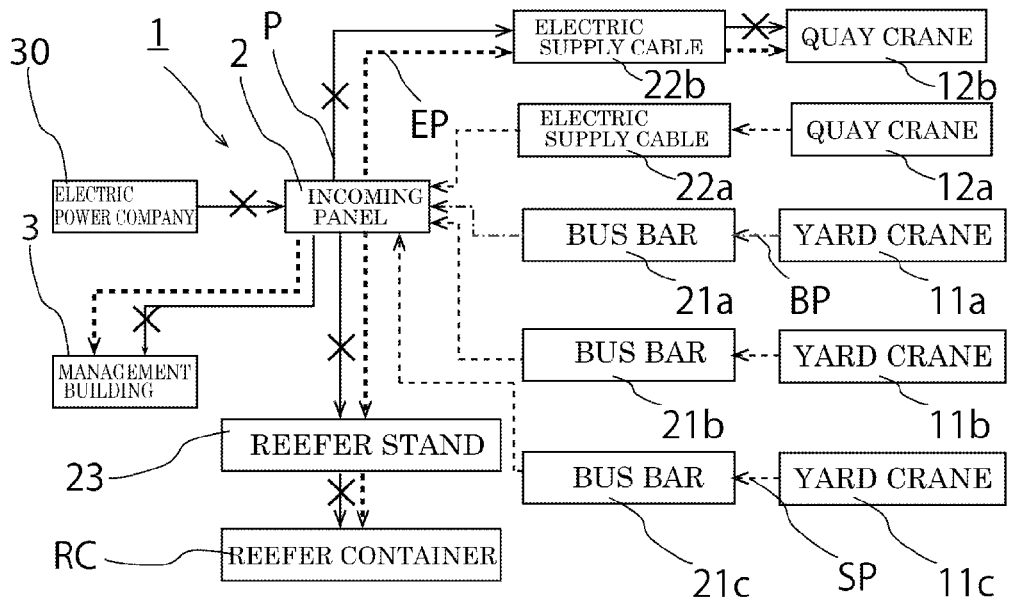
FIG. 2 is a schematic diagram showing flow of electric power in the container terminal of the first embodiment according to the present invention.

Next, the flow of electric power in the container terminal 1 of the first embodiment according to the present invention will be described with reference to FIG. 2. In a normal situation (which refers to a situation where electric power can be supplied from the incoming panel 2 to the electrically-powered machines 11, 12, and RCs as well as the management building 3), electric power P from the electric power company 30 is sent from the incoming panel 2 to the management building 3 and the electrically-powered machines via the electric supply lines 20. The supply of the electric power P to the electrically-powered machines is made such that the yard cranes 11a to 11c are supplied via the bus bars 21a to 21c, the quay cranes 12a and 12b are supplied via the cable reels 22a and 22b, and the reefer containers RCs is supplied via the reefer stands 23.

On the other hand, in an emergency situation (which refers to a situation where electric power cannot be supplied from the incoming panel 2 to the electrically-powered machines 11, 12, and RCs as well as the management building 3, such as a case of electric outage where no electric power is supplied from the electric power company 30, and similar cases), reference electric power BP of the yard crane 11a operating in the container terminal 1 is sent via the bus bar 21a. Moreover, same-phase electric power SP of the yard cranes 11b and 11c is sent to the incoming panel 2 via the bus bars 21b and 21c. In addition, same-phase electric power SP of the quay crane 12a, which is not in cargo handling operation, is also sent to the incoming panel 2 via the cable reel 22a. The electric power sent to the incoming panel 2 (the reference electric power BP and the same-phase electric power SP) is sent as emergency electric power EP from the incoming panel 2 to the management building 3, the quay crane 12b in cargo handling operation, and the reefer containers RCs.

According to the above-described method, in the emergency situation, by using the yard cranes 11a to 11c and the quay crane 12a as power sources, electric power of the yard cranes 11a to 11c and the quay crane 12a (the reference electric power BP and the same-phase electric power SP) can be supplied to the incoming panel 2 of the container terminal 1. Since the electric power can be sent as the emergency electric power EP to the electrically-powered machines such as the quay crane 12b and the reefer stands 23 and to the management building 3, it is possible to prevent the terminal management system of the container terminal 1 from being stopped, the quay crane 12b in cargo handling operation from being stopped, and the temperatures of the reefer containers RCs from being increased, and the like.

Moreover, since electric power (the reference electric power BP and the same-phase electric power SP) can be supplied from the yard cranes 11a to 11c and the quay crane 12a, which are in operation in the container terminal 1, the emergency electric power EP can be supplied in the container terminal 1 promptly after the occurrence of the emergency.

Furthermore, since electric power (the reference electric power BP and the same-phase electric power SP) can be supplied from the plurality of cargo handling machines (the yard cranes 11a to 11c and the quay crane 12a), a large amount of emergency electric power EP can be supplied.

In the above-described emergency electric power supply method for the container terminal 1, the cargo handling machines may be limited to one type, for example, only the yard cranes 11a to 11c, or the method may be carried out with a plurality of types of cargo handling machines as described above.

On the other hand, although the container terminal 1 of the first embodiment according to the present invention has been described as a method of supplying electric power to the incoming panel 2 in the emergency situation, electric power may be supplied to the management building 3 and the reefer stands 23, which require electric power in an emergency situation, without using the incoming panel 2. For example, a switchboard for supplying electric power to the management building 3, or the like may be provided near the management building 3 so as to supply electric power directly from the cargo handling machine in operation in the vicinity. According to this configuration, it is possible to also deal with a situation where electric power cannot be supplied to a certain site because of breakage of the electric supply lines 20 in the container terminal 1, and the like.

Moreover, in the container terminal 1 of the first embodiment according to the present invention, the electric power sensors 41 to 45 are provided in the electric supply lines 20 to determine whether or not electric power is supplied. However, it suffices if it can be detected that electric power is not supplied, and the present invention is not limited to this configuration. For example, the present invention may be configured such that a sensor for detecting occurrence of an earthquake and the like is combined so that electric power can be supplied in advance from the yard cranes 11a to 11c to the incoming panel 2 before supply of electric power is disabled by occurrence of an earthquake.

Next, the yard cranes 11a and 11b of the container terminal 1 of the first embodiment according to the present invention will be described with reference to FIG. 3 and FIG. 4. Since the yard crane 11c has the same configuration as that of the yard crane 11b, and the yard crane 11c will not be described.

Each of the yard cranes 11a and 11b has a configuration in which a non-regenerative converter 53 is added to a known configuration including a diesel engine (power generator) 51, a regenerative converter (power conditioning unit) 52, inverters (power conditioning units) 54a to 54c, motors 55a to 55c, and a back power resistor 56. In addition, the yard cranes 11a and 11b include a bus bar (electric power supply device) 21a and a bus bar 21b.

The non-regenerative converter 53 is an AC-DC conversion circuit enabling AC regenerative braking, and any normal AC-DC converter can be used as the non-regenerative converter 53 as long as the AC-DC converter has a bi-directionality between powering and regenerative operations, can be used as a converter in the powering operation, and can be used as an inverter in the regenerative operation. However, a PWM converter is preferable. This non-regenerative converter 53 is provided between a diesel engine 51 and inverters 54a to 54c.

Next, an emergency electric power supply method for the yard cranes 11a and 11b will be described. Here, besides the powering electric power P and the regenerative electric power RP, electric power to be supplied from the yard crane 11a to the container terminal 1 in the emergency situation will be referred to as reference electric power BP while electric power to be supplied from the yard crane 11b to the container terminal 1 in the emergency situation will be referred to as same-phase electric power SP.

Figure 3:
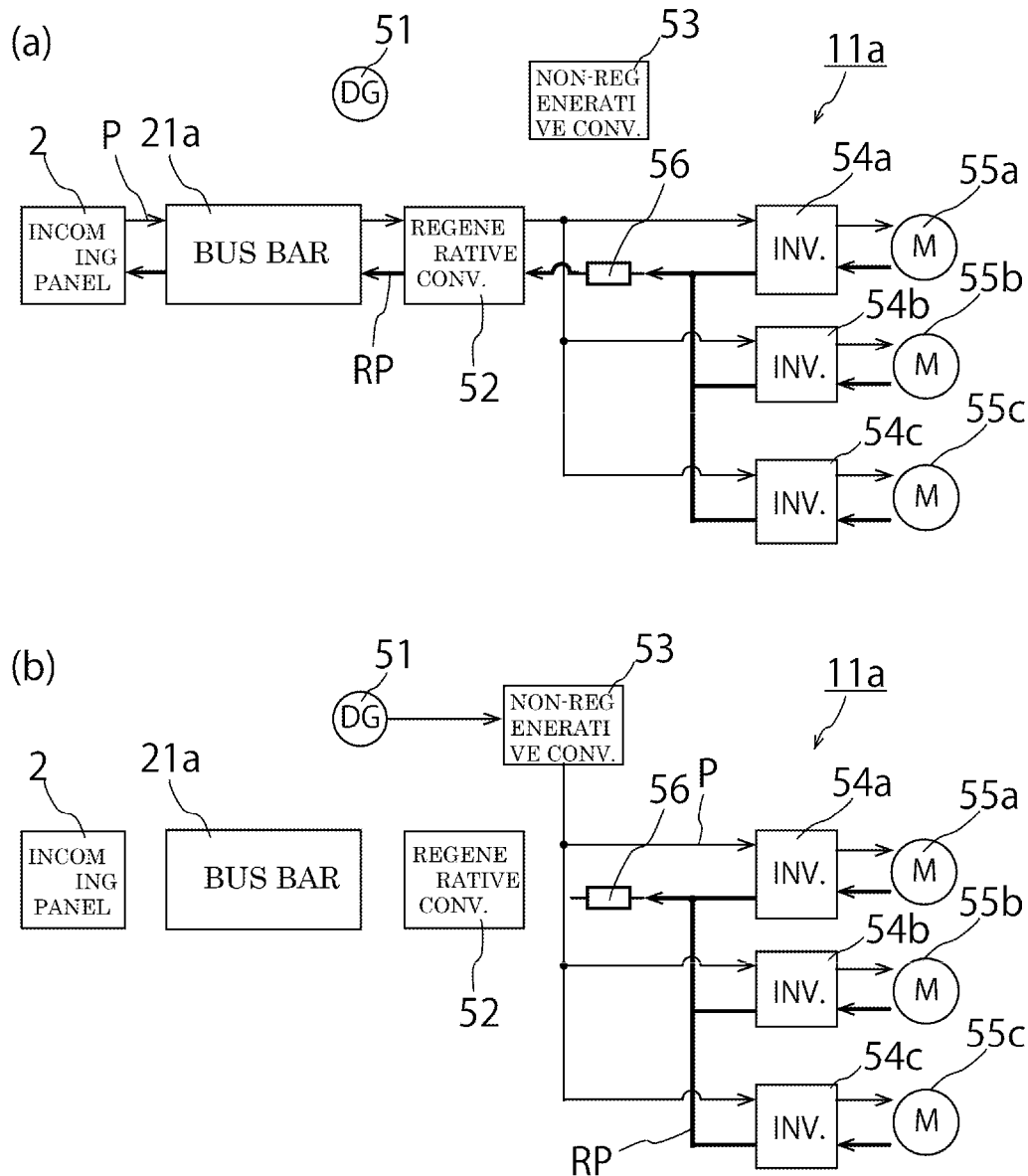
FIG. 3 is schematic diagrams showing flows of electric power in a normal situation in yard cranes of the container terminal of the first embodiment according to the present invention, where Part (a) shows flow of electric power from an incoming panel and Part (b) shows flow of electric power at the time of lane change.

As shown in Part (a) of FIG. 3, in the normal situation, the yard crane 11a (11b) receives the powering electric power P from the incoming panel 2 via the bus bar 21a (21b). The yard crane 11a (11b) converts the received powering electric power P from AC to DC in the regenerative converter 52, and further converts the resultant power from DC to AC in the inverters 54a to 54c while controlling the voltage and frequency, and sends the resultant power to the motors 55a to 55c.

On the other hand, the regenerative electric power RP generated in each of the motors 55a to 55c is sent to the incoming panel 2. At this time, even if electric power exceeding the emergency electric power is generated from the regenerative electric power of the yard cranes 11a and 11b, the excessive power can be consumed by the back power resistor 56, so that electric power can be stably supplied.

In addition, as shown in Part (b) of FIG. 3, the yard crane 11a (11b) includes the diesel engine 51 for use in performing lane change of the bus bar 21a (21b). When using the diesel engine 51, the powering electric power P generated by the diesel engine 51 is converted from AC to DC by the non-regenerative converter 53, the resultant power is sent to each of the inverters 54a to 54c. The inverters 54a to 54c then send the power to the respective motors 55a to 55c while converting the power from DC to AC and controlling the voltage and frequency. In this way, the lane change is performed.

Next, the flow of electric power in each of the yard crane 11a and the yard crane 11b in the emergency situation will be described. As shown in Part (a) of FIG. 4, in the emergency situation, the yard crane 11a, which serves as the reference power source, sends the reference electric power BP, which is generated by the diesel engine 51, to the incoming panel 2 via the bus bar 21a.

Figure 4:
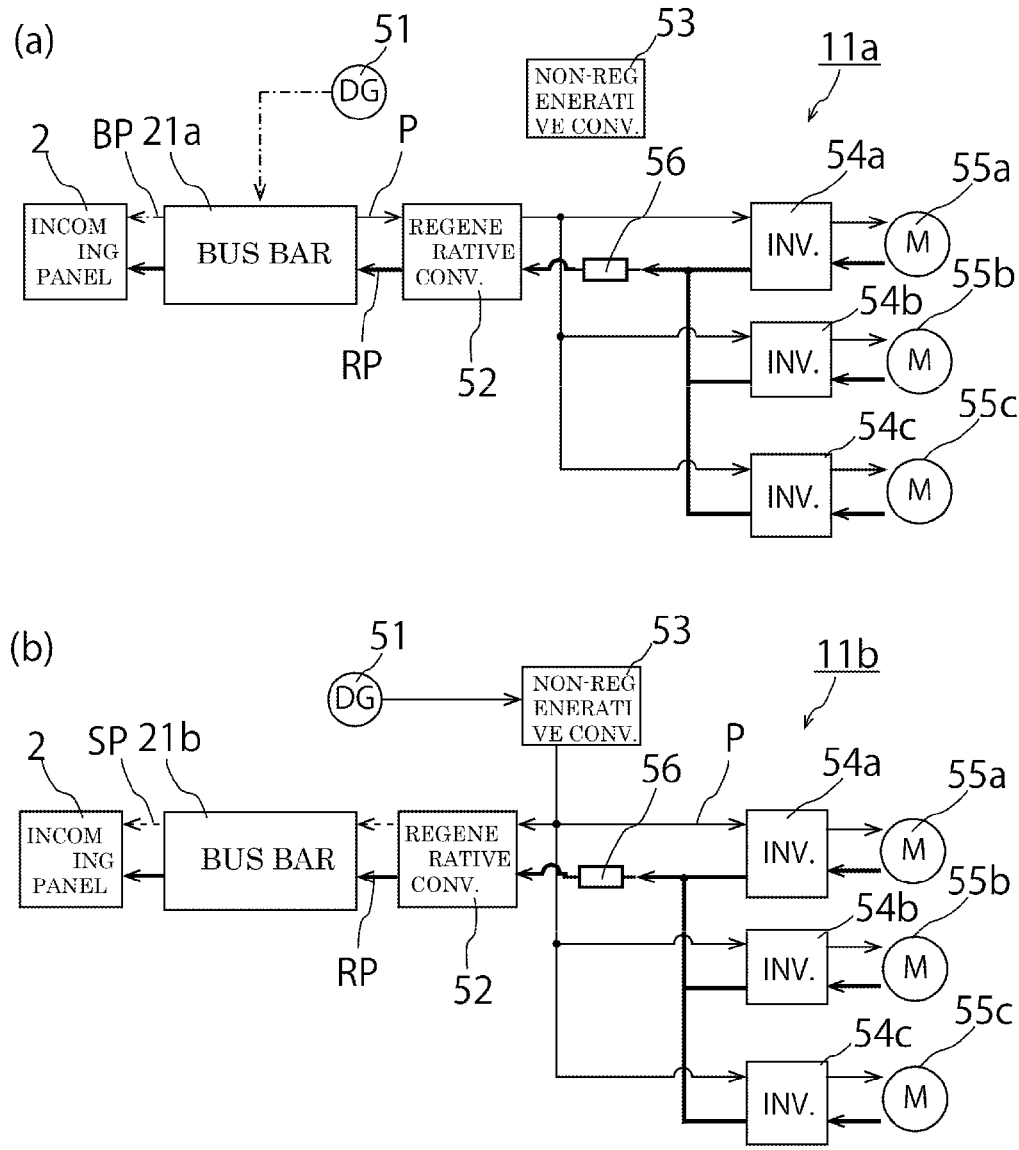
FIG. 4 is schematic diagrams showing flows of electric power in an emergency situation in yard cranes of the container terminal of the first embodiment according to the present invention, where Part (a) shows flow of electric power of a reference power source and Part (b) shows flow of electric power of a same-phase power source.

On the other hand, as shown in Part (b) of FIG. 4, the yard crane 11b, which serves as the same-phase power source, send the AC electric power, which is generated by the diesel engine 51, to the non-regenerative converter 53. Since the electric powers generated by the diesel engines 51 in the respective yard cranes 11a and 11b are AC electric powers, the phases of the electric powers are different. For this reason, the electric powers cannot be sent at once from the plurality of yard cranes 11a and 11b.

In view of this, when a DC electric power is sent from the non-regenerative converter 53 of the yard crane 11b to the regenerative converter 52 and is converted from DC to AC in the regenerative converter 52, the phase of the electric power is matched to the frequency of the reference electric power BP. The technique to match the phases of the electric power is a known technique, and will thus not be described.

The same-phase electric power SP matched to the frequency of the reference electric power BP is sent to the incoming panel 2 via the bus bars 21b. At the same time, the yard crane 11b sends the electric power from the non-regenerative converter 53 also to the inverters 54a to 54c.

According to this configuration, it is possible to use the single yard crane 11a in the container terminal 1 as the reference power source to send the reference electric power BP to the incoming panel 2 and to use the plurality of remaining yard cranes 11b and 11c as the same-phase power sources to send the same-phase electric power SP, which is matched to the phase of the reference electric power BP by using the non-regenerative converter 53 and the regenerative converter 52, to the incoming panel 2. In this way, the reference electric power BP and the same-phase electric power SP can be sent from the plurality of yard cranes 11a to 11c to the incoming panel 2, so that a large capacity of the emergency electric power EP can be used.

Moreover, it is only necessary to add the non-regenerative converter 53 to each of the yard cranes 11a to 11c, which can secure the emergency electric power EP for the emergency situation with less costs than that to be spent when a plurality of power generators are provided in the container terminal 1.

In addition, the bus bar 21a to 21c, which receive the electric power from the incoming panel 2 in the normal situation, can be used for supplying the electric power from the yard cranes 11a to 11c in the emergency situation. For this reason, there is no need of separately providing a device or the like for sending electric power to the incoming panel 2 for emergency. Furthermore, providing the non-regenerative converter 53 makes it possible to supply electric power to the container terminal 1 without stopping the operation of the yard cranes 11b and 11c.

Figure 5:
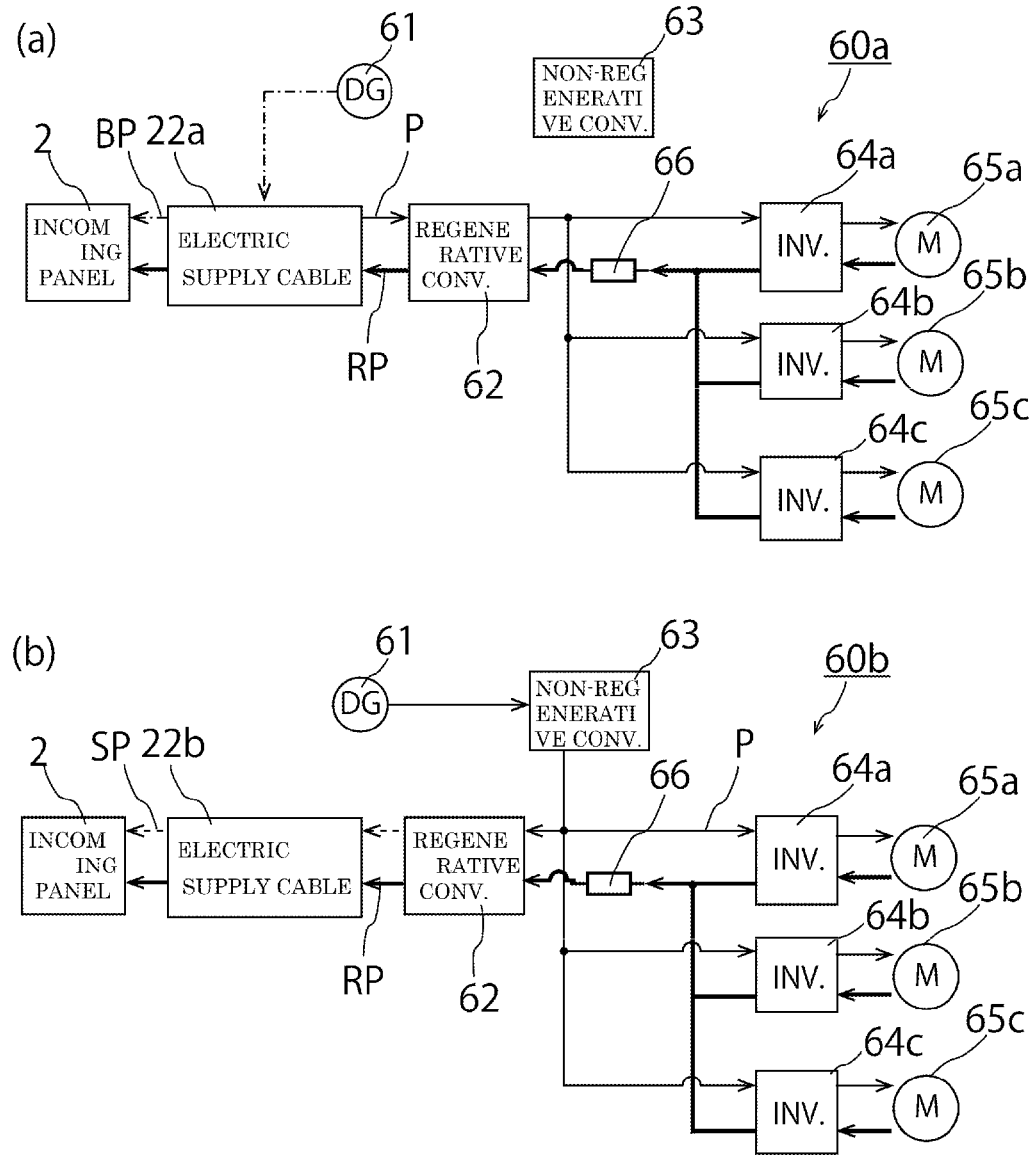
FIG. 5 is schematic diagrams showing flows of electric power in an emergency situation in yard cranes of a container terminal of a second embodiment according to the present invention, where Part (a) shows flow of electric power of a reference power source and Part (b) shows flow of electric power of a same-phase power source.

Next, yard cranes of other embodiments according to the present invention will be described. However, since the flow of electric power in the normal situation is a known technique and will not be described. Yard cranes of a container terminal of a second embodiment according to the present invention will be described with reference to FIG. 5.

In place of the bus bars 21a and 21b of the configuration shown in FIG. 3 described above, as shown in Parts (a) and (b) of FIG. 3, yard cranes 60a and 60b include electric supply cables (electric power supply devices) 22a and 22b. As the electric supply cables 22a and 22b, any electric cables can be used as long as they can supply electric power from the incoming panel 2 to the yard cranes 60a and 60b in the normal situation and can supply electric power from the yard cranes 60a and 60b to the incoming panel 2 in the emergency situation. A cable reel included in a conventional yard crane can be used. According to this configuration, since the electric supply cables 22a and 22b operate similarly to the bus bars 21a and 21b, it is possible to achieve the same operations and effects as those described above.

Next, yard cranes of a container terminal of a third embodiment according to the present invention will be described with reference to Parts (a) and (b) of FIG. 6. Although the yard cranes 70a and 70 have the same configuration as that shown in FIG. 3, how to use a non-regenerative converter 73 and an inverter 74a provided as power conditioning units is different.

Figure 6:
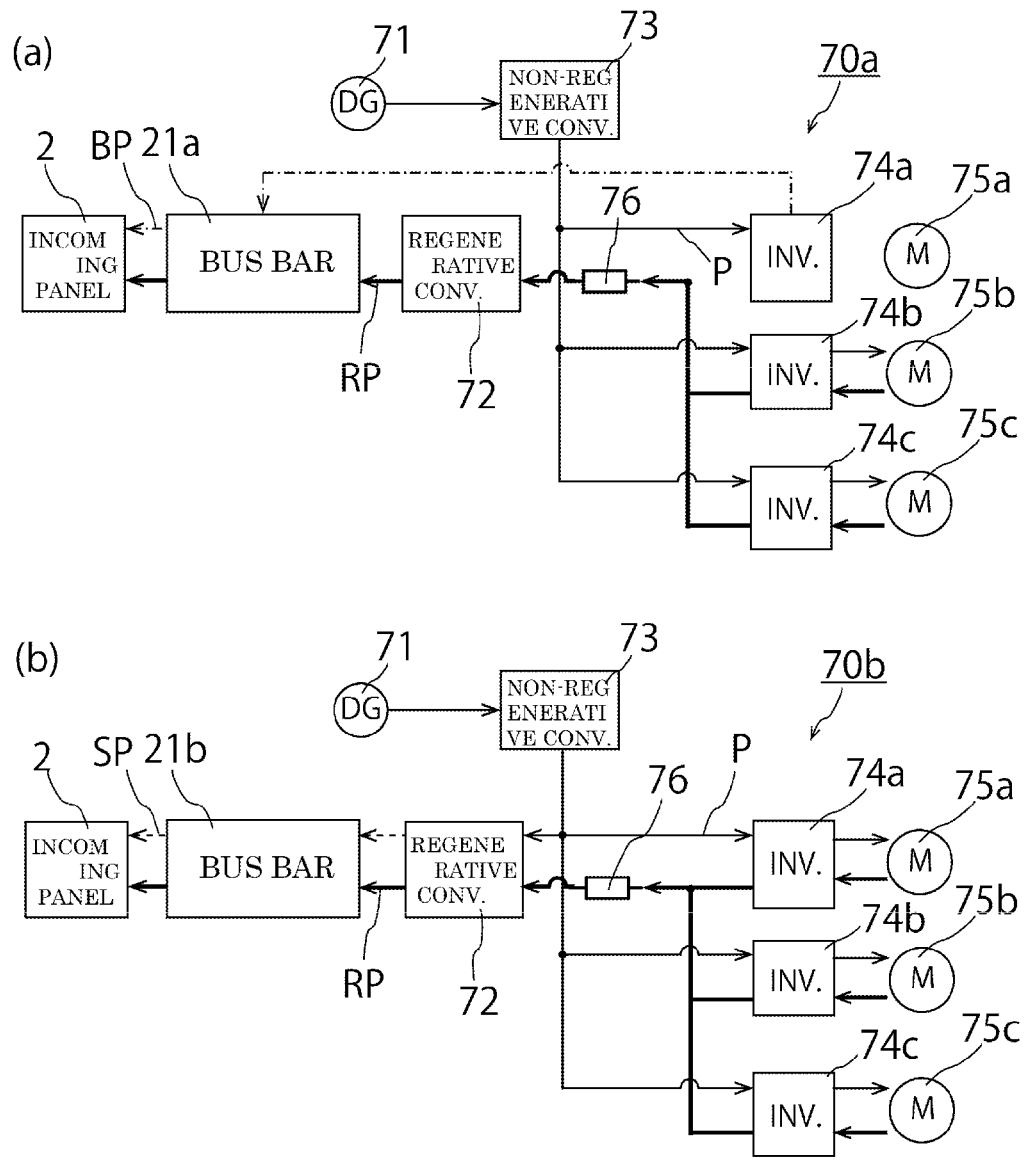
FIG. 6 is schematic diagrams showing flows of electric power in an emergency situation in yard cranes of a container terminal of a third embodiment according to the present invention, where Part (a) shows flow of electric power of a reference power source and Part (b) shows flow of electric power of a same-phase power source.

As shown in Part (a) of FIG. 6, in the emergency situation, the yard crane 70a sends electric power, which is generated by the diesel engine 71, to the inverters 74a to 74c via a non-regenerative converter 73. At this time, the yard crane 70a converts the electric power P, which is AC, to DC. The DC is converted to AC in the inverter 74a and is sent to the incoming panel 2 via the bus bar 21a as the reference electric power BP. At this time, since the inverter 74a is used for sending the reference electric power BP to the container terminal 1, the electric power cannot be sent to only the motor 75a.

On the other hand, in the emergency situation, the yard crane 70b sends the same-phase electric power SP to the incoming panel 2 after matching the phase of the same-phase electric power SP to the frequency of the reference electric power BP by the known technique using the regenerative converter 72 and the non-regenerative converter 73, as shown in Part (b) of FIG. 6, according to the same method as that explained in Part (b) of FIG. 3. At this time, even if electric power exceeding the emergency electric power is generated from the regenerative electric power of the yard cranes 70a and 70b, the excessive power can be consumed by the back power resistor 76, so that electric power can be stably supplied.

According to this configuration, unlike the first embodiment and the second embodiment, the use of the non-regenerative converter 73 and the inverter 74a as power conditioning units for producing the reference electric power BP makes it possible to supply stable electric power with reduced voltage fluctuation.

The third embodiment is configured such that electric power is not supplied to the motor 75a when the inverter 74a is used for sending the reference electric power BP or the same-phase electric power SP to the incoming panel 2. However, the present invention is not limited to this configuration because it is only necessary to be able to supply electric power to the container terminal 1 by using one of conventionally provided inverters. For example, a line configured to supply electric power to the motor 75a may be separately provided between the inverter 74a and the regenerative converter 72.

Next, yard cranes of a container terminal of a fourth embodiment according to the present invention will be described with reference to Parts (a) and (b) of FIG. 7. Each of yard cranes 80a and 80b includes a diesel engine 81, a non-regenerative converter 83, inverters 84a to 84c, motors 85a to 85c, and a back power resistor 86, and has a known configuration such that the yard crane 80a or 80b operates with electric power generated by the diesel engine 81 without receiving supply of electric power from an incoming panel 2 of a container terminal 1 in the normal situation. A regenerative converter 82 and electric supply cables 22a and 22b are added to this configuration. It is only necessary for the electric supply cables 22a and 22b to be able to send electric power to the incoming panel 2 in the emergency situation, and may use a known technique.

Figure 7:
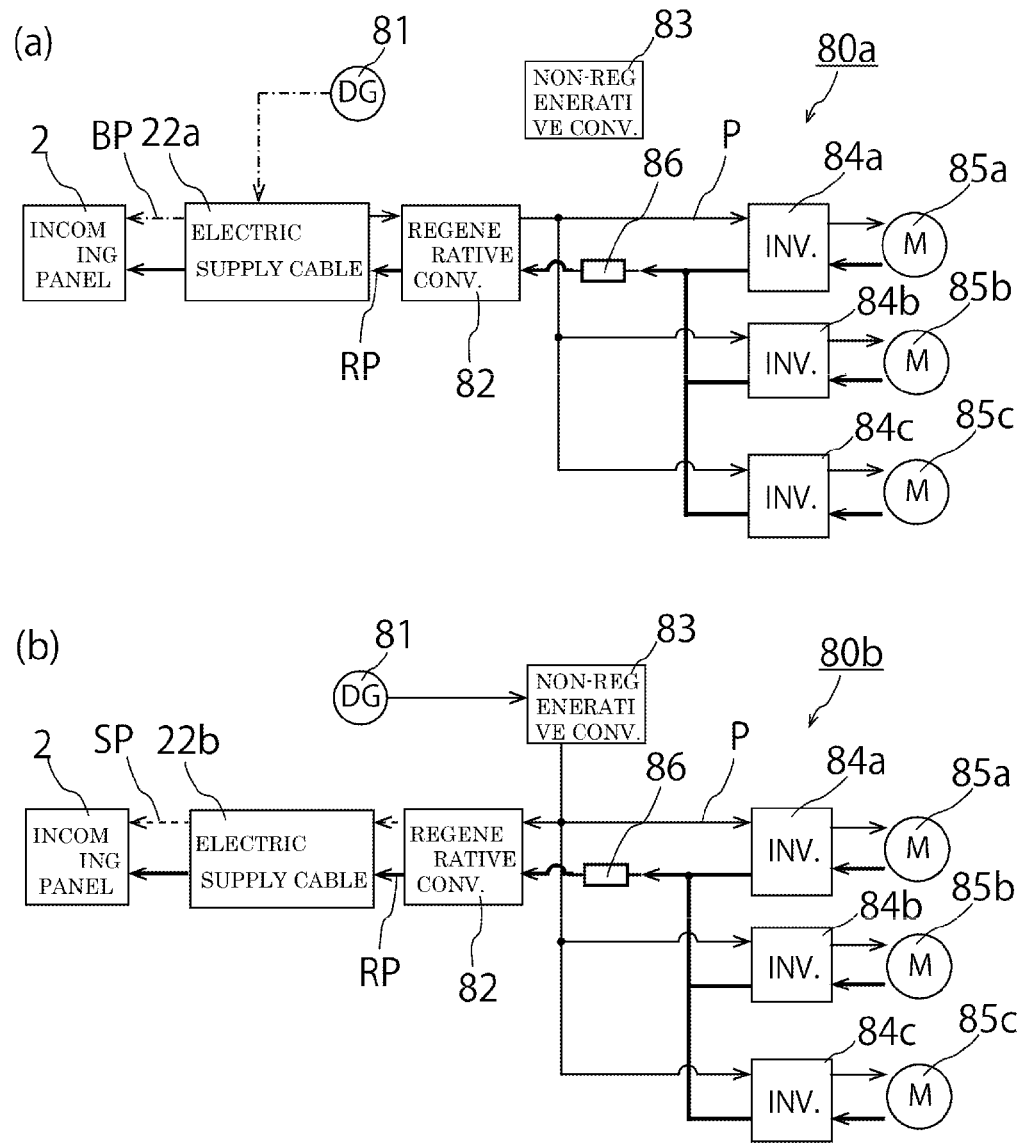
FIG. 7 is schematic diagrams showing flows of electric power in an emergency situation in yard cranes of a container terminal of a fourth embodiment according to the present invention, where Part (a) shows flow of electric power of a reference power source and Part (b) shows flow of electric power of a same-phase power source.

As shown in Part (a) of FIG. 7, in the emergency situation, the yard crane 80a sends the reference electric power BP without using a converter. At this time, electric power to each of the motors 85a to 85c is sent via the non-regenerative converter 83. Moreover, although not shown, electric power may be sent via the regenerative converter 82. On the other hand, as shown in Part (b) of FIG. 7, the yard crane 80b sends the same-phase electric power SP to the incoming panel 2 after matching the phase of the same-phase electric power SP to the frequency of the reference electric power BP by the known technique using the non-regenerative converter 83 and the regenerative converter 82.

According to this configuration, it is possible to achieve the same operations and effects as those described above by including the regenerative converters 82 in the yard cranes 80a and 80b, which operate only with electric power generated by the diesel engine 81, which is a power generator, in the normal situation, and by connecting the yard cranes 80a and 80b to the electric supply cables 25a and 25b configured to send electric power to the incoming panel 2.

Next, yard cranes of a container terminal of a fifth embodiment according to the present invention will be described with reference to Parts (a) and (b) of FIG. 8. Each of the yard cranes 90a and 90b is a yard crane including a storage battery (secondary battery) 91, a regenerative converter 92, inverters 94a to 94c, motors 95a to 95c, and a back power resistor 96, and configured to be charged with electric power from the incoming panel 2 through electric supply cables 22a and 22b.

In the normal situation, each of the yard cranes 90a and 90b converts AC electric power, which is received from the incoming panel 2 via the electric supply cables 22a and 22b, to DC in the regenerative converter 92 and charges the storage battery 91. In the actual operation, each yard crane 90a or 90b operates by using electric power charged in the storage battery 91. The storage battery 91 is a known one called a secondary battery or a battery, and for example, a lead storage battery, a nickel-hydrogen storage battery, a lithium-ion secondary battery, or the like may be used.

Figure 8:
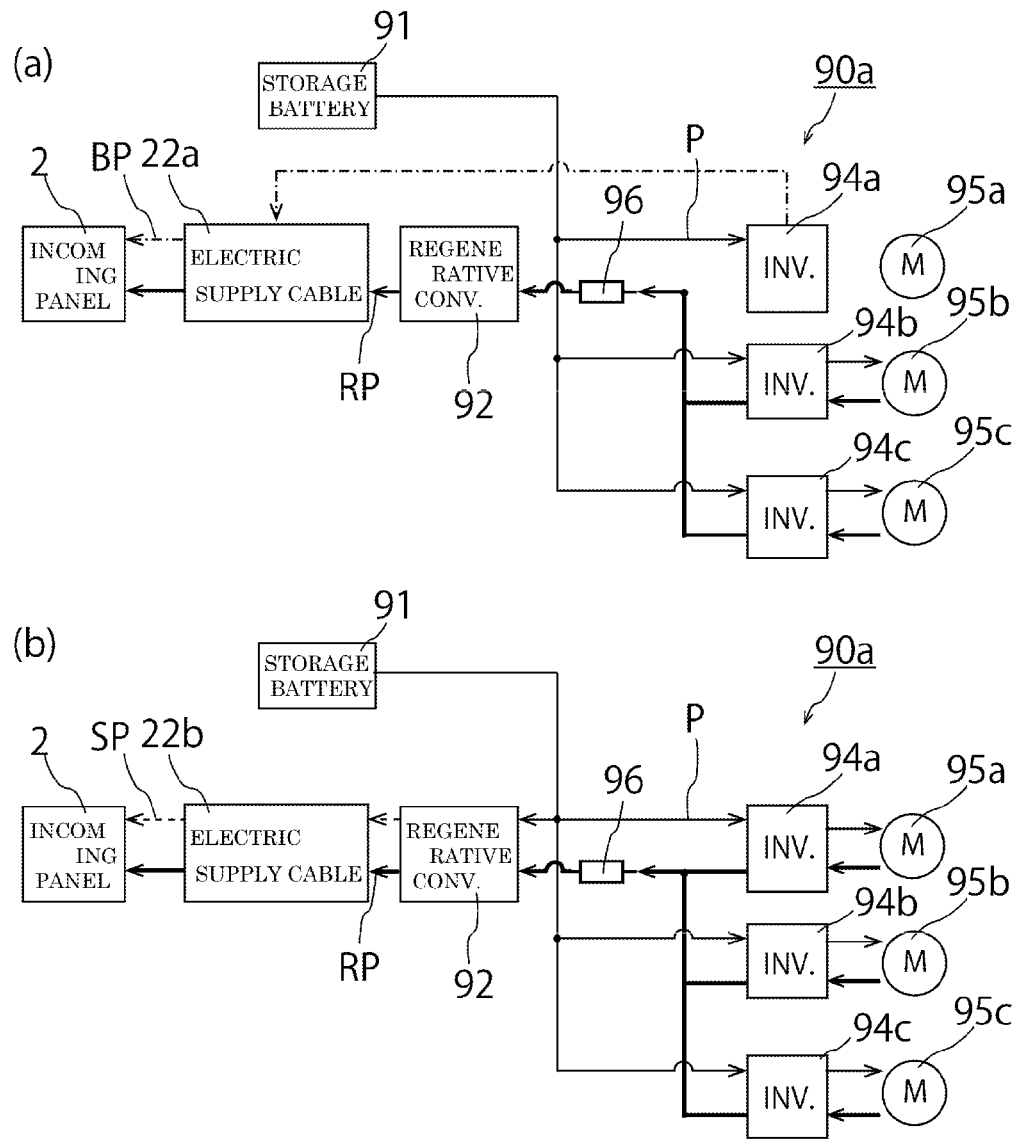
FIG. 8 is schematic diagrams showing flows of electric power in an emergency situation in yard cranes of a container terminal of a fifth embodiment according to the present invention, where Part (a) shows flow of electric power of a reference power source and Part (b) shows flow of electric power of a same-phase power source.

As shown in Part (a) of FIG. 8, in the emergency situation, the yard crane 90a sends electric power of the storage battery 91 to each of the inverters 94a to 94c, and sends the reference electric power BP from the inverter 94a to the incoming panel 2 via the electric supply cables 22a. At this time, the inverter 94a sends electric power to be supplied to the incoming panel 2, and accordingly does not supply electric power to the motor 95a. On the other hand, as shown in Part (b) of FIG. 8, in the emergency situation, the yard crane 90b sends electric power of the storage battery 91 to the incoming panel 2 via the electric supply cables 22b after converting the electric power in the regenerative converter 92.

At this time, since the electric power is sent always after being converted from DC to AC in the converter or the inverter, the same-phase electric power SP is sent to the incoming panel 2 after matching the phase of the same-phase electric power SP to the frequency of the reference electric power BP by the known technique using the regenerative converter 92. Moreover, when the electric power supplied in the container terminal 1 is DC, the electric power can be supplied without using the converter.

According to this configuration, it is possible to supply electric power from the yard cranes 90a and 90b each including the storage battery 91, which is charged with DC electric power, to the incoming panel 2 of the container terminal 1. Moreover, the storage battery may be of a cassette type. In addition, bus bars may be used in place of the electric supply cables 22a and 22b. Furthermore, in the same manner as that of the third embodiment, a line configured to supply electric power to the motor 95a may be separately provided between the inverter 94a and the regenerative converter 92.

The present invention has been described by giving the yard cranes including diesel engines and storage batteries for performing lane change as examples. However, even in the case where a yard crane does not include any of these, if a motor for operating the main machine, for example, the motors 55a to 55c in the first embodiment are used as power generators, electric power can be supplied to the container terminal.

The configuration of the cargo handling machine which can be used as an emergency power source for the container terminal 1 of the first to fifth embodiments according to the present invention described above is not limited to the above-described configuration. For example, although the electric power supplied into the above-described container terminal 1 is AC, when the electric power supplied into the above-described container terminal 1 is DC, the present invention can be applied by using a rectifier (preferably a mercury arc rectifier) and an inverter (preferably a static inverter) as a power conditioning unit.

INDUSTRIAL APPLICABILITY

The container terminal of the present invention is capable of using a cargo handling machine which independently operates as a power source, and using electric power of the cargo handling machine as an emergency electric power, in an emergency situation where electric power cannot be supplied to a management building and electrically-powered machines in the container terminal due to electric outage of the container terminal, or the like. This provides a high safety and a high maintainability for freights such as containers even in the emergency situation, and accordingly the present invention is applicable to a container terminal.

EXPLANATION OF REFERENCE NUMERALS 1 container terminal
2 incoming panel
3 management building
11 yard crane
12 quay crane
13 trailer
20 electric supply line
21 bus bar (electric power supply device)
22 electric supply cable (electric power supply device)
23 reefer stand
51, 61, 71, 81 diesel engine (power generator)
91 storage battery
52, 62, 72, 82, 92 regenerative converter (power conditioning unit)
53, 63, 73, 83 non-regenerative converter (power conditioning unit)
74a, 94a inverter (power conditioning unit)
P powering electric power
RP regenerative electric power
BP reference electric power
SP same-phase electric power

The invention claimed is:

1. A container terminal comprising:
an incoming panel configured to receive electric power supplied by an electric power company and to supply the electric power to buildings and electrically-powered equipment inside the container terminal;
a cargo handling machine operating in the container terminal, the cargo handling machine including one of a power generator and a storage battery; and
an electric power supply device connected to the incoming panel and to the cargo handling machine, the electric power supply device being configured to send the electric power bidirectionally in a first direction from the incoming panel to the cargo handling machine in a normal situation and in a second direction from the cargo handling machine to the incoming panel and from the incoming panel to the buildings and the electrically-powered equipment inside the container terminal in an emergency situation; wherein the electric power supply device comprises one of a bus bar and a cable reel, and the electric power supply device is always connected to both the incoming panel and the cargo handling machine: and
wherein the one of the power generator and the storage battery of the cargo handling machine is configured to supply the electric power to the buildings and the electrically-powered equipment inside the container terminal via the incoming panel.

2. The container terminal according to claim 1, wherein the cargo handling machine includes a motor provided therein and the power generator, and the cargo handling machine is configured to make the electric power suppliable from the power generator simultaneously to the incoming panel and to the motor in the emergency situation, the container terminal further comprising:
a non-regenerative converter which converts AC supplied from the power generator to DC;
a regenerative converter which converts the DC supplied from the non-regenerative converter to the AC and supplies the AC to the electric power supply device; and an inverter which converts the DC supplied from the non-regenerative converter to the AC and supplies the AC to the motor provided in the cargo handling machine.

3. The container terminal according to claim 1, wherein the cargo handling machine includes a motor provided therein and the storage battery, and the cargo handling machine is configured to make the electric power suppliable from the storage battery simultaneously to the incoming panel and the motor, the container terminal further comprising:
   a regenerative converter which converts DC supplied from the storage battery to AC and supplies the AC to the electric power supply device; and
   an inverter which converts the DC supplied from the storage battery to the AC and supplies to the motor provided in the cargo handling machine.

4. An emergency power supply method for supplying emergency power to the container terminal of claim 1, comprising the steps of:
   maintaining the electric power supply device in a condition of always being connected to both the incoming panel and the cargo handling machine:
   in the normal situation, sending the electric power to the electric power supply device in the first direction from the incoming panel to the cargo handling machine, and supplying the electric power to the cargo handling machine via the electric power supply device; and
   in the emergency situation, sending the electric power to the electric power supply device in the second direction from the cargo handling machine to the incoming panel and from the incoming panel to the buildings and the electrically-powered equipment inside the container terminal, and supplying the electric power to the incoming panel via the electric power supply device.

5. The emergency power supply method according to claim 4, wherein the cargo handling machine includes a motor provided therein and the power generator, and the cargo handling machine is configured to make the electric power suppliable from the power generator simultaneously to the incoming panel and to the motor in the emergency situation, the method comprising the further steps of:
   in an emergency situation in which the electric power is supplied from the power generator to the incoming panel, converting AC supplied from the power generator to DC using a non-regenerative converter, then converting the DC to the AC using a regenerative converter, and then supplying the AC to the incoming panel via the electric power supply device; and
   in an emergency situation in which the electric power is supplied from the power generator to the motor, converting the AC supplied from the power generator to the DC using the non-regenerative converter, and then converting the DC to the AC using an inverter, and then supplying the AC from the inverter to the motor.

6. The emergency power supply method according to claim 5, wherein the container terminal includes a plurality of the cargo handling machines and wherein in the emergency situation, the electric power is sent from the plurality of the cargo handling machines to the incoming panel, the method comprising the further steps of:
   using at least one of the plurality of the cargo handling machines as a reference power source; and
   matching phases of electric power of the other of the plurality of the cargo handling machines to a phase of electric power of the reference power source.

7. The emergency power supply method according to claim 4, wherein the cargo handling machine includes a motor provided therein and the storage battery, and the cargo handling machine is configured to make the electric power suppliable from the storage battery simultaneously to the incoming panel and to the motor in the emergency situation, the method comprising the further steps of:
   in an emergency situation in which the electric power is supplied from the storage battery to the incoming panel, converting DC supplied from the storage battery to AC using a regenerative converter, and then supplying the AC to the incoming panel via the electric power supply device; and
   in an emergency situation in which the electric power is supplied from the storage battery to the motor, converting the DC supplied from the storage battery to the AC using an inverter, and then supplying the AC to the motor.

8. The emergency power supply method according to claim 7, wherein the container terminal includes a plurality of the cargo handling machines and wherein in the emergency situation, the electric power is sent from the plurality of the cargo handling machines to the incoming panel, the method comprising the further steps of:
   using at least one of the plurality of the cargo handling machines as a reference power source; and
   matching phases of electric power of the other of the plurality of the cargo handling machines to a phase of electric power of the reference power source.

9. The emergency power supply method according to claim 4, wherein the container terminal includes a plurality of the cargo handling machines and wherein in the emergency situation, the electric power is sent from the plurality of the cargo handling machines to the incoming panel, the method comprising the further steps of:
   using at least one of the plurality of the cargo handling machines as a reference power source; and
   matching phases of electric power of the other of the plurality of the cargo handling machines to a phase of electric power of the reference power source.

10. The emergency power supply method according to claim 4, comprising the further step of:
    using the cargo handling machine to perform its own cargo handling and also to supply the electric power to the buildings and the electrically-powered equipment in the container terminal in the emergency situation.

11. The container terminal according to claim 1, wherein the cargo handling machine is configured to perform its own cargo handling and also to supply the electric power to the buildings and the electrically-powered equipment in the container terminal in the emergency situation.

* * * * *